United States Patent
Ziskind et al.

(10) Patent No.: US 10,615,866 B2
(45) Date of Patent: Apr. 7, 2020

(54) LOCALIZED CONTENT DELIVERY PLATFORM

(71) Applicant: ATC Technologies, LLC, Reston, VA (US)

(72) Inventors: Ilya Ziskind, Sterling, VA (US); David Nance, Sterling, VA (US); Santanu Dutta, Vienna, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 16/189,651

(22) Filed: Nov. 13, 2018

(65) Prior Publication Data
US 2019/0149228 A1 May 16, 2019

Related U.S. Application Data

(60) Provisional application No. 62/585,927, filed on Nov. 14, 2017.

(51) Int. Cl.
*G01S 19/41* (2010.01)
*H04B 7/204* (2006.01)
(Continued)

(52) U.S. Cl.
CPC ............ *H04B 7/2041* (2013.01); *G01S 19/41* (2013.01); *G01S 19/43* (2013.01); *H04B 7/0617* (2013.01);
(Continued)

(58) Field of Classification Search
CPC ............... H04B 7/2041; H04B 7/0617; H04B 7/18513; H04B 7/18526; G01S 14/41; G01S 19/43
(Continued)

(56) References Cited

U.S. PATENT DOCUMENTS 5,260,639 A * 11/1993 De Young ............... H02J 50/30
322/2 R
6,385,647 B1 * 5/2002 Willis .................... H04L 29/06
709/217
(Continued)

FOREIGN PATENT DOCUMENTS

CN 101923171 12/2010
WO 2017117584 7/2017

OTHER PUBLICATIONS

PCT/US2018/060780 International Search Report and Written Opinion dated Jan. 24, 2019 (16 pages).

*Primary Examiner* — Hai V Nguyen
(74) *Attorney, Agent, or Firm* — Michael Best & Friedrich LLP

(57) ABSTRACT

A system includes a modulator, a beam former, earth equipment, and a spotbeam satellite. The modulator is configured to receive localized content, generate N localized content delivery platform frames from the localized content, and generate intermediate frequency (IF) carriers that are modulated with the N localized content delivery platform frames. The beam former is configured to process the IF carriers to enable beamforming in a satellite service band. The earth equipment is configured to frequency translate the IF carriers that are processed into feederlink signals in a feederlink band, and transmit the feederlink signals. The spotbeam satellite is configured to receive the feederlink signals, generate a multicast transmission by frequency translating the feederlink signals to the satellite service band, and transmit the multicast transmission to form N spotbeams, N being an integer greater than zero.

20 Claims, 8 Drawing Sheets

| 302 | 304 | 306A | 308A | ... | 306N | 308N |
|---|---|---|---|---|---|---|
| MULTICAST ADDRESS | NUMBER OF GEOGRAPHIC AREAS | GEOGRAPHIC AREA IDENTIFIER 1 | LOCAL CONTENT MESSAGE 1 | ••• | GEOGRAPHIC AREA IDENTIFIER N | LOCAL CONTENT MESSAGE N |

300

(51) Int. Cl.
    *H04B 7/185*   (2006.01)
    *H04B 7/06*    (2006.01)
    *G01S 19/43*   (2010.01)

(52) U.S. Cl.
    CPC ..... *H04B 7/18513* (2013.01); *H04B 7/18526* (2013.01)

(58) Field of Classification Search
    USPC ........................................... 455/12.1
    See application file for complete search history.

(56) References Cited

U.S. PATENT DOCUMENTS

| | | | |
|---|---|---|---|
| 6,473,032 B1* | 10/2002 | Trimble | G01S 19/11 342/357.41 |
| 7,266,097 B2* | 9/2007 | Christodoulides | H04B 7/18513 370/321 |
| 9,645,248 B2* | 5/2017 | Wallace | G01S 19/41 |
| 9,835,729 B2* | 12/2017 | Wallace | G01S 19/43 |
| 9,903,957 B2* | 2/2018 | Wallace | G01S 19/43 |
| 9,923,626 B2* | 3/2018 | Loomis | H04B 7/22 |
| 9,945,959 B2* | 4/2018 | Wallace | G01S 19/32 |
| 10,101,465 B2* | 10/2018 | Loomis | G01S 19/41 |
| 10,191,157 B2* | 1/2019 | Dai | G01S 19/44 |
| 2004/0114547 A1* | 6/2004 | Christodoulides | H04B 7/18513 370/316 |
| 2010/0201570 A1* | 8/2010 | Shemar | G01S 5/10 342/357.59 |
| 2013/0293412 A1* | 11/2013 | Appleford | G01S 19/04 342/357.23 |
| 2014/0292569 A1* | 10/2014 | Wallace | G01S 19/43 342/357.42 |
| 2014/0292570 A1* | 10/2014 | Wallace | G01S 19/41 342/357.42 |
| 2015/0301191 A1* | 10/2015 | Wallace | G01S 19/32 342/357.42 |
| 2015/0309177 A1* | 10/2015 | Wallace | G01S 19/41 342/357.25 |
| 2016/0003948 A1* | 1/2016 | Loomis | G01S 19/43 342/357.26 |
| 2016/0036519 A1* | 2/2016 | Loomis | H04B 7/22 370/316 |
| 2017/0269222 A1* | 9/2017 | Dai | G01S 19/41 |
| 2019/0123813 A1* | 4/2019 | Mendelsohn | H04B 7/2041 |

* cited by examiner

LOCALIZED CONTENT DELIVERY PLATFORM

CROSS-REFERENCE TO RELATED APPLICATION

This application claims the benefit of U.S. Provisional Application No. 62/585,927, filed on Nov. 14, 2017, the entire content of which is hereby incorporated by reference.

FIELD OF INVENTION

The present disclosure relates to a wireless communication system, and more specifically, a wireless communication system for a localized content delivery platform.

BACKGROUND

A unicast delivery method may be used in satellite communications to deliver content to multiple recipients in a coverage area via a beam. However, the same content is delivered to all of the recipients in the coverage area regardless of the recipients' location in the coverage area. Thus, a conventional unicast delivery method is an inefficient and impractical method for delivering localized content.

SUMMARY

In some embodiments, a Localized Content Delivery Platform (LCDP) allows for transport-efficient content delivery over satellite to multiple recipients with more granular localization than the coverage area provided by a beam. One example of an LCDP is satellite delivery of augmentation signals to improve the accuracy of Global Navigation Satellite Systems (GNSS) using the IP Multicast protocol.

Conventionally, a correction vector (referred to herein as "CV") may be distributed to a recipient by a duplex unicast link, as is a common practice when using cellular data links using the networked transport of reasonable transportation control measure (RTCM) via Internet Protocol (NTRIP). In the conventional method, the recipient sends a message to a corrections processor (referred to herein as "CP") requesting a CV corresponding to the recipient's approximate location, which is provided in the request message, as well as the internet protocol (IP) address of the recipient. In response to the request message, the CP starts sending CV messages to the IP address of the recipient with a certain predetermined update rate (e.g., an update rate of one second). The issue of optimizing the CV to the geographic location of the recipient is addressed by the recipient providing its location in the request message. If the recipient moves a known, sufficiently large, distance relative to the location from which the request message was issued, the recipient may reissue the request message and cause the CP to move a Geographic Center of Correction (referred to herein as "GCC") in the subsequent stream of CVs.

As the number of recipients of CV messages increases in a given area, the conventional unicast delivery method becomes inefficient due to the consumption of air time for transmission of location updates for the recipients. However, a broadcast/multicast approach consistent with the present disclosure overcomes the inefficiencies of the conventional unicast delivery method at least because the broadcast/multicast approach of present disclosure does not require location updates from the recipients.

The correction vectors described above are one non-limiting example of localized content that may be distributed by the localized content delivery platform (LCDP) of the present disclosure. However, the exemplary embodiments described below are not limited to correction vectors, but instead, may distribute any "localized content."

In one aspect, the present disclosure includes a system for delivering localized content. The system includes a modulator, an analog interface, a beam former, earth equipment, and a spotbeam satellite. The modulator is configured to receive a plurality of localized content, generate N localized content delivery platform frames from the plurality of localized content, and generate intermediate frequency (IF) carriers that are modulated with the N localized content delivery platform frames. The beam former is configured to process the IF carriers to enable beamforming in a satellite service band. The earth equipment is configured to frequency translate the IF carriers that are processed into feederlink signals in a feederlink band, and transmit the feederlink signals. The spotbeam satellite is configured to receive the feederlink signals, generate a multicast transmission by frequency translating the feederlink signals to the satellite service band, and transmit the multicast transmission to form N spotbeams, N being an integer greater than zero.

In another aspect, the present disclosure includes a method for delivering localized content. The method includes receiving, with a modulator, a plurality of localized content, generating, with the modulator, N localized content delivery platform frames from the plurality of localized content, and generating, with the modulator, intermediate frequency (IF) carriers modulated with the N localized content delivery platform frames. The method includes processing, with a beam former, the IF carriers to enable beamforming in a satellite service band. The method includes frequency translating, with earth equipment, the IF carriers that are processed into feederlink signals in a feederlink band, and transmitting, with the earth equipment, the feederlink signals. The method also includes receiving, with a spotbeam satellite, the feederlink signals, generating, with the spotbeam satellite, a multicast transmission by frequency translating the feederlink signals to the satellite service band, and transmitting, with the spotbeam satellite, the multicast transmission to form N spotbeams, N being an integer greater than zero.

In another aspect, the present disclosure includes a rover. The rover includes a satellite communication device, a memory, and an electronic processor communicatively coupled to the memory. The electronic processor is configured to receive a multicast transmission in one or more of N spotbeams via the satellite communication device, and extract localized content from the multicast transmission, N being an integer greater than zero.

In yet another aspect, the present disclosure includes a non-transitory computer-readable medium comprising instructions that, when executed by an electronic processor, cause the electronic processor to perform a set of operations. The set of operations including controlling a satellite communication device to receive a multicast transmission in one or more of N spotbeams and extracting localized content from the multicast transmission, N being an integer greater than zero.

Other aspects of the present disclosure will become apparent by consideration of the detailed description and accompanying drawings.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or carried out in various ways.

Figure 1:
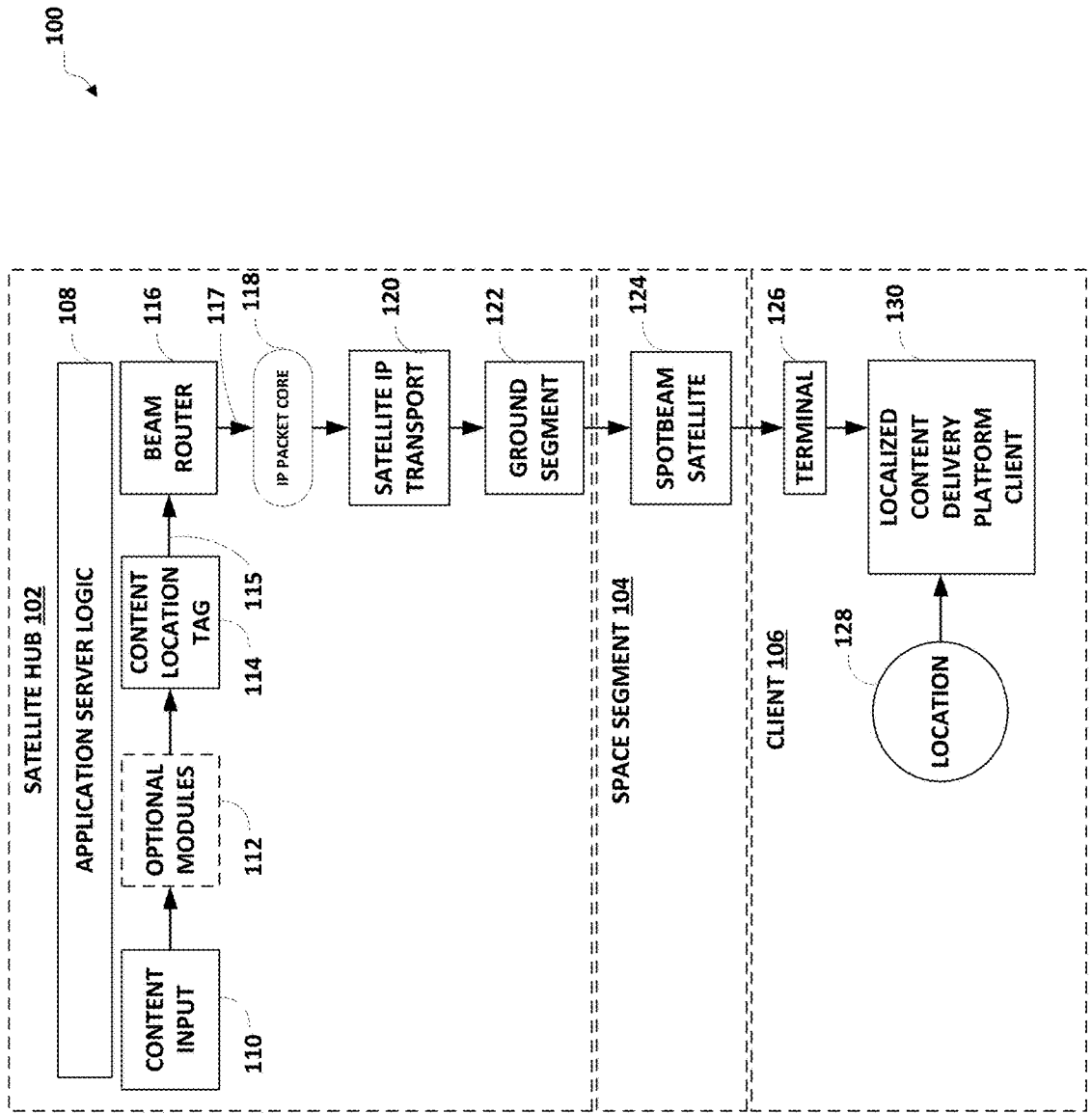
FIG. 1 is a block diagram illustrating a localized content delivery platform in accordance with various exemplary embodiments.

FIG. 1 is a block diagram illustrating a localized content delivery platform 100 in accordance with various exemplary embodiments. The localized content delivery platform 100 includes a satellite hub 102, a space segment 104, and a client 106.

The satellite hub 102 includes application server logic 108 for performing a plurality of operations. The plurality of operations can include receiving a content input 110. The content input 110 can include information (e.g., image data or non-image data) that is relevant and specific to a particular geographic area (i.e., information that can be "localized"). In some examples, the content input 110 may be weather information for a particular geographic area. In other examples, as discussed in greater detail with reference to FIGS. 4 and 5, the content input 110 may be one correction vector of a set of correction vectors from a corrections processor, each correction vector of the set of correction vectors is relevant to a particular geographic area (e.g., near certain grid points on a map). In yet other examples, the content input 110 may be amber alert information that is relevant and specific to a particular geographic area. The content input 110 may be any information that is relevant to a particular geographical area and is not limited to any particular purpose or content.

The plurality of operations can also include processing the content input 110 with optional modules 112. In some examples, the content input 110 may be compressed using one or more of the optional modules 112. In other examples, the content input 110 may receive content protection from one or more of the optional modules 112. In yet other examples, the content input 110 may have conditional access applied by one or more of the optional modules 112. In yet further examples, some or all of the above operations may be performed by the optional modules 112.

The plurality of operations also includes tagging the content input 110 with a content location tag 114 and inserting the content input 110 and the content location tag 114 into an LCDP frame to generate localized content 115. In some examples, the content input 110 is one piece of information of a plurality of pieces of information contained in the LCDP frame. For example, the plurality of pieces of information contained in the LCDP frame may be a number of the content input 110 received over time. Each piece of information of the plurality of pieces of information may be individually tagged with a specific location tag to generate a plurality of the localized content 115. The location tag includes geographic coordinates corresponding to a zip code, a county, other suitable location-specific identifier, or a combination thereof.

The plurality of operations also includes performing UDP/Multicast content adaption and beam mapping with the beam router 116 to generate N localized content delivery platform frames 117 from the plurality of the localized content 115 for specific spotbeams using UDP/Multicast. The beam router 116 transmits the N localized content delivery platform frames 117 to the ground segment 122 via an IP packet core 118 and a satellite IP transport 120. The ground segment 122 includes a ground-based beam former that processes the specific spotbeam content 117 to enable a spotbeam satellite to transmit the specific spotbeam content 117 in a satellite service band (e.g., the L-band). The ground segment 122 also includes an earth antenna and a feederlink radio frequency (RF) sub-system that frequency translates the N specific spotbeam content 117 into a feederlink band (e.g., the Ku-band) and transmits the N specific spotbeam content 117.

The space segment 104 includes a spotbeam satellite 124. The spotbeam satellite 124 receives the N specific spotbeam content 117 from the ground segment 122 and transmits each of the N specific spotbeam content 117 in one of N spotbeams.

In the illustrated example, client 106 includes a terminal 126, a location 128, and a localized content delivery platform (LCDP) client 130. The terminal 126 is a satellite communication device (e.g., a satellite receiver or a satellite transceiver) that receives one or more of the N specific spotbeam content 117 over the satellite service band (e.g., the L-band). In some examples, the terminal 126 outputs the one or more of the N specific spotbeam content 117 to the LCDP client 130. In other examples, the terminal 126 is part of the LCDP client 130. In yet other examples, the terminal 126 performs one or more of decompression, removal of content protection, or satisfaction of conditional access before outputting the one or more of the N specific spotbeam content 117 to the LCDP client 130.

In some examples, the location 128 is a location of the LCDP client 130. The LCDP client 130 receives or determines the location 128 and compares the location 128 to each location tag in the one or more of the N specific spotbeam content 117 that is received from the spotbeam satellite 124 via the terminal 126. The LCDP client 130 can extract information from the one or more of the N specific spotbeam content 117 based on each location tag and the location 128. For example, the LCDP client 130 determines whether the location 128 is within a predetermined distance of each location tag and extracts information that is determined to be within the predetermined distance of each location tag. In some examples, the LCDP client 130 may extract weather information regarding a zip code from the one or more of the N specific spotbeam content 117 based on a determination that the location 128 is within a predetermined distance of the zip code.

Additionally or alternatively, in some examples, and as discussed in greater detail below with reference to FIGS. 4 and 5, the LCDP client 130 may extract a correction vector regarding geographical coordinates (also referred to as a "grid point") from the one or more N specific spotbeam content 117 based on a determination that the location 128 is within a predetermined distance of the geographical coordinates. The LCDP client 130 may correct the location 128 with the extracted correction vector to determine a second location of the LCDP client 130 that is accurate to within one to ten centimeters rather than the location 128 that is accurate to within one to ten meters.

Figure 2:
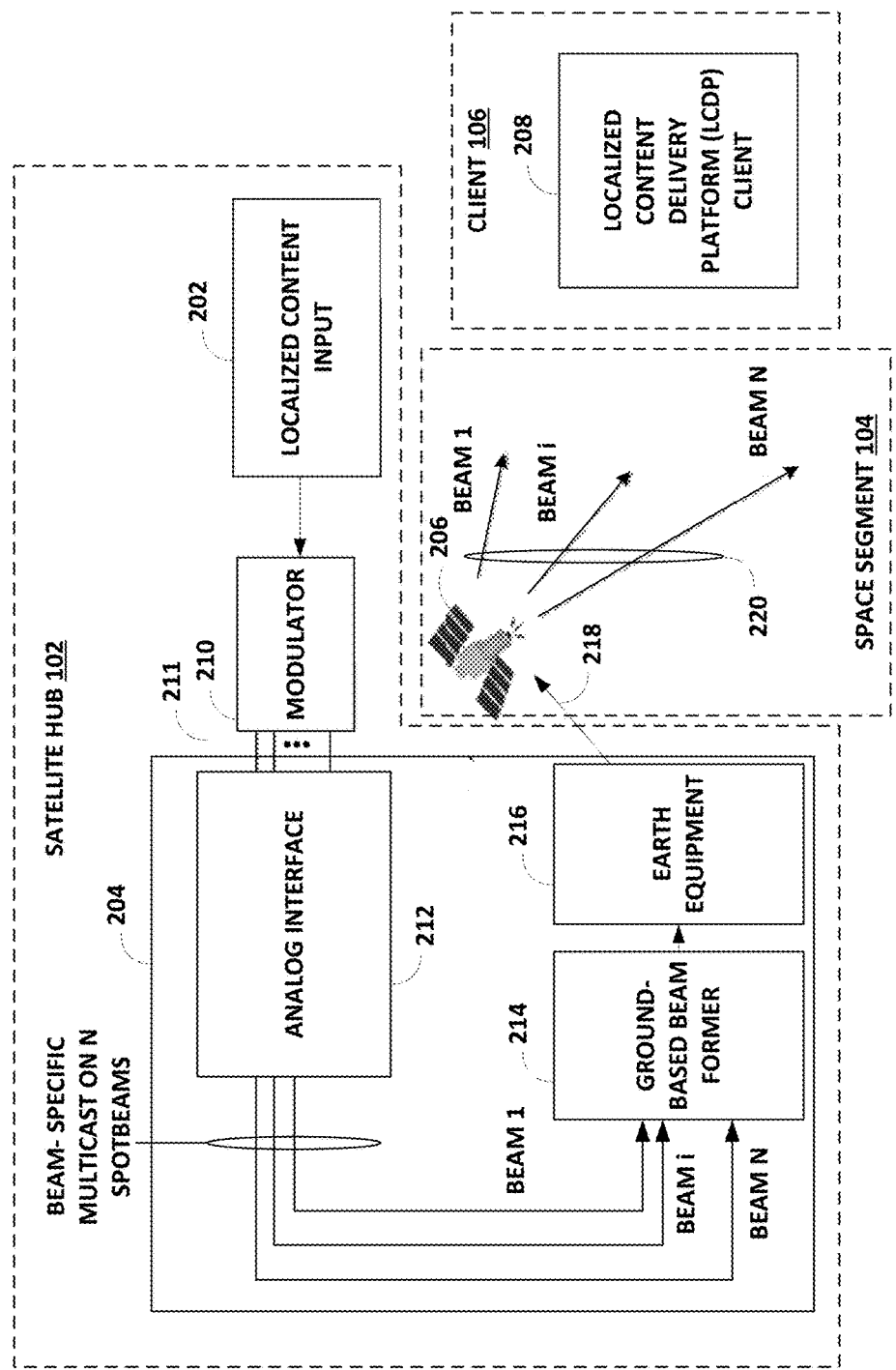
FIG. 2 is a diagram illustrating a system with a localized content delivery platform using a broadcast/multicast delivery network in accordance with various exemplary embodiments.

FIG. 2 is a diagram illustrating a system 200 with a localized content delivery platform (e.g., the platform 100 of FIG. 1) using a broadcast/multicast delivery network in accordance with various exemplary embodiments. In the example of FIG. 2, system 200 includes a localized content input 202, a satellite gateway infrastructure 204, a spotbeam satellite 206, and a localized content delivery platform (LCDP) client 208. For ease of understanding, the description of FIG. 2 is provided below with reference to various components in FIG. 1.

As illustrated in FIG. 2, the localized content input 202 and the satellite gateway infrastructure 204 is part of the satellite hub 102 as described above in FIG. 1. The localized content input 202 is similar to the localized content 115 of FIG. 1. The satellite gateway infrastructure 204 is similar to a combination of the beam router 116, the IP packet core 118, the satellite IP transport 120, and the ground segment 122 of FIG. 1.

As illustrated in FIG. 2, the spotbeam satellite 206 is part of the space segment 104 as described above in FIG. 1. The spotbeam satellite 206 is similar to the spotbeam satellite 124 of FIG. 1.

Further, as illustrated in FIG. 2, the LCDP client 208 is part of the client 106 as described in FIG. 1. The LCDP client 208 is similar to the localized content delivery platform client 130. In the example of FIG. 2, the LCDP client 208 also includes the terminal 126 and the location 128 of FIG. 1.

The localized content input 202 can include information that is relevant and specific to particular geographic areas with corresponding location tags. In some examples, the localized content input 202 may be weather information for particular geographic areas with location tags for the particular geographic areas. In other examples, as discussed in greater detail with reference to FIGS. 4 and 5, the localized content input 202 may be a set of correction vectors with location tags, each of which is relevant to particular geographic area (near certain grid points on a map) identified in the location tags. In yet other examples, the localized content input 202 may be amber alert information with location tags that is relevant and specific to one or more particular geographic areas identified in the location tags.

The satellite gateway infrastructure 204 is an earth-based satellite control hub including a modulator 210, an analog interface 212, a ground-based beam former (referred to herein as "GBBF") 214, and earth equipment 216.

The modulator 210 includes memory and an electronic processor. The memory may include a program storage area (for example, read only memory (ROM)) and a data storage area (for example, random access memory (RAM), and other non-transitory, machine-readable medium). The electronic processor may be, for example, a microprocessor or other suitable processing device. The modulator 210 generates N intermediate frequency carriers (referred to herein as "IF carriers") that correspond to the N spotbeams which blanket the coverage area of the spotbeam satellite 206. The N IF carriers are output to the analog interface 212.

Each of the N IF carriers are modulated with data corresponding to a specific subset (e.g., one of the N localized content delivery platform frames 117 as described above) of the localized content input 202 according to the grid point concept described below. The subsets may include some overlap in that some of the information across the subsets may be similar or the same. The subsets may also include some overlap in that some the subsets have overlapping geographic areas of relevance because the spotbeams overlap. The N modulated IF carriers are input to the analog interface 212, which is the gateway to the satellite infrastructure.

The analog interface 212 includes memory and an electronic processor. The memory may include a program storage area (for example, read only memory (ROM)) and a data storage area (for example, random access memory (RAM), and other non-transitory, machine-readable medium). The analog interface 212 outputs the N modulated IF carriers as a beam-specific multicast for N spotbeams to the GBBF 214.

In some examples, the GBBF 214 includes memory and an electronic processor. The memory may include a program storage area (for example, read only memory (ROM)) and a data storage area (for example, random access memory (RAM), and other non-transitory, machine-readable medium). The GBBF 214 digitally processes the beam-specific multicast on N spotbeams to enable beamforming in a satellite service band (e.g., the L-band) at the spotbeam satellite 206. N is an integer that is greater than zero and less than M. In the example of FIG. 2, N is twenty-one. However, N can take arbitrary values and using values other than twenty-one, including a value of one (corresponding to a global beam), are within the scope of the present disclosure. Additionally, in some examples, a space-based beam former (SBBF) may be used on the spotbeam satellite 206 instead of forming the beams on the ground using the GBBF 214.

The earth equipment 216 includes an earth station antenna and a feederlink radio frequency (referred to herein as "RF") sub-system. The feederlink RF sub-system includes memory and an electronic processor. The memory may include a program storage area (for example, read only memory (ROM)) and a data storage area (for example, random access memory (RAM), and other non-transitory, machine-readable medium). The feederlink RF sub-system frequency translates to a feederlink band (e.g., the Ku-band), and uplinks the feederlink signals 218 to the spotbeam satellite 206 using the earth station antenna.

The spotbeam satellite 206 includes memory and an electronic processor. The memory may include a program storage area (for example, read only memory (ROM)) and a data storage area (for example, random access memory (RAM), and other non-transitory, machine-readable medium). The spotbeam satellite 206 frequency translates the feederlink signals 218 to a satellite service band (e.g., the L-band), and transmits the feederlink signals 218 to the ground using a phase array antenna subsystem, where N spotbeams 220 are formed by the relative amplitude tapers and phase shifts provided by the GBBF 214.

The LCDP client 208 includes memory, an electronic processor, and a satellite communication device (for example, a satellite receiver or a satellite transceiver). The memory may include a program storage area (for example, read only memory (ROM)) and a data storage area (for example, random access memory (RAM), and other non-transitory, machine-readable medium). The electronic processor may be, for example, a microprocessor or other suitable processing device.

In some examples, the LCDP client 208 is a smartphone that determines local weather information from the modulated localized content from one of the N spotbeams when the localized content input 202 is weather information. In other examples, the LCDP client 208 is a satellite radio. In yet other examples, the LCDP client 208 is a rover or other suitable satellite client.

Figure 3:
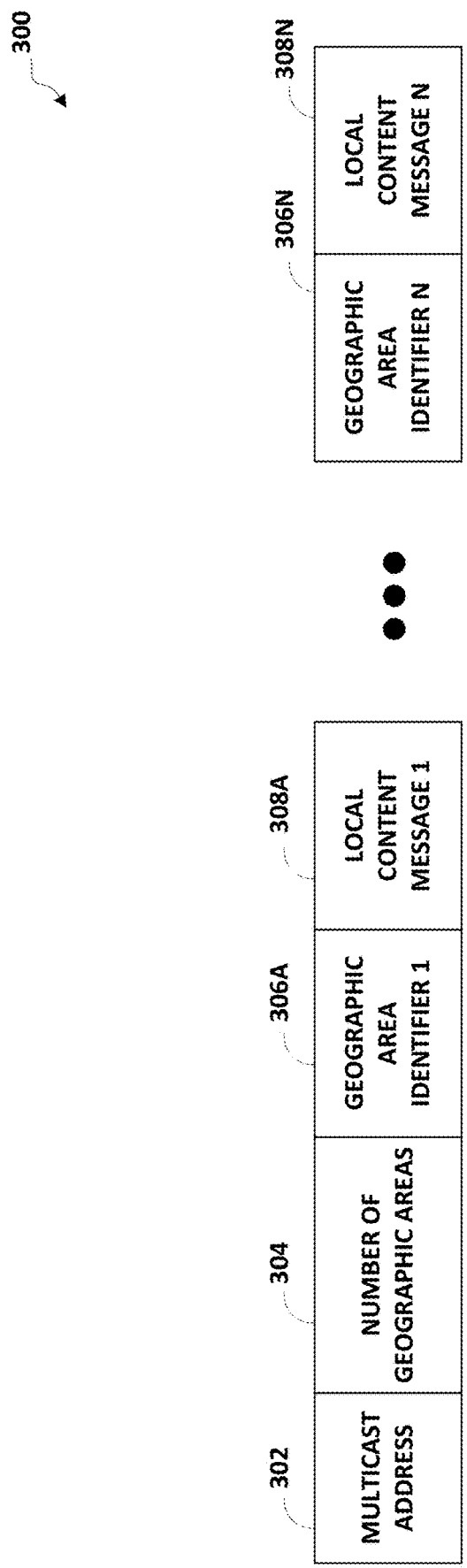
FIG. 3 is a block diagram illustrating an example data format of a localized content delivery platform frame.

FIG. 3 is a block diagram illustrating an example data format of a localized content delivery platform frame 300. The localized content delivery platform frame 300 includes a portion of the localized content 202 of FIG. 2 (e.g., one of the N localized content delivery platform frames 117 of FIG. 1) and is delivered in one of the N spotbeams by the spotbeam satellite 206. In the example of FIG. 3, the localized content delivery platform frame 300 includes a multicast address section 302, a number of geographic areas section 304, a plurality of geographic area identifiers sections 306A-306N, and a plurality of local content message sections 308A-308N.

The multicast address section 302 includes a network identifier of a client (for example, an address associated with the LCDP client 208 of FIG. 2). In some examples, the multicast address section 302 is a network identifier that corresponds to the common multicast IP address.

The number of geographic areas section 304 includes information indicative of the number of geographic areas covered by the given spotbeam. In some examples, the number of geographic areas section 304 may include information regarding the number of zip codes covered by the given spotbeam.

Each of the plurality of geographic area identifier sections 306A-306N includes an identifier that identifies each geographic area of the plurality of grid points (e.g., geographic coordinates that correspond to a zip code, a county, a state, or other suitable geographic area). In some examples, each of the plurality of geographic area identifier sections 306A-306N may be the location tag described with respect to FIG. 1.

Each of the plurality of local content message sections 308A-308A can include information regarding a local content message for a given geographic area. For example, the local content message section 308A includes information regarding a first local content message for the first geographic area associated with the geographic area identifier section 306A. Likewise, the local content message section 308B includes information regarding an N-th local content message for the N-th geographic area associated with the geographic area identifier section 306B.

In some examples, each of the plurality of local content message sections 308A-308A may be the content input described with respect to FIG. 1. Together, the plurality of geographic area identifier sections 306A-306N and the plurality of local content message sections 308A-308A are a subset of the plurality of the localized content discussed above.

Figure 4:
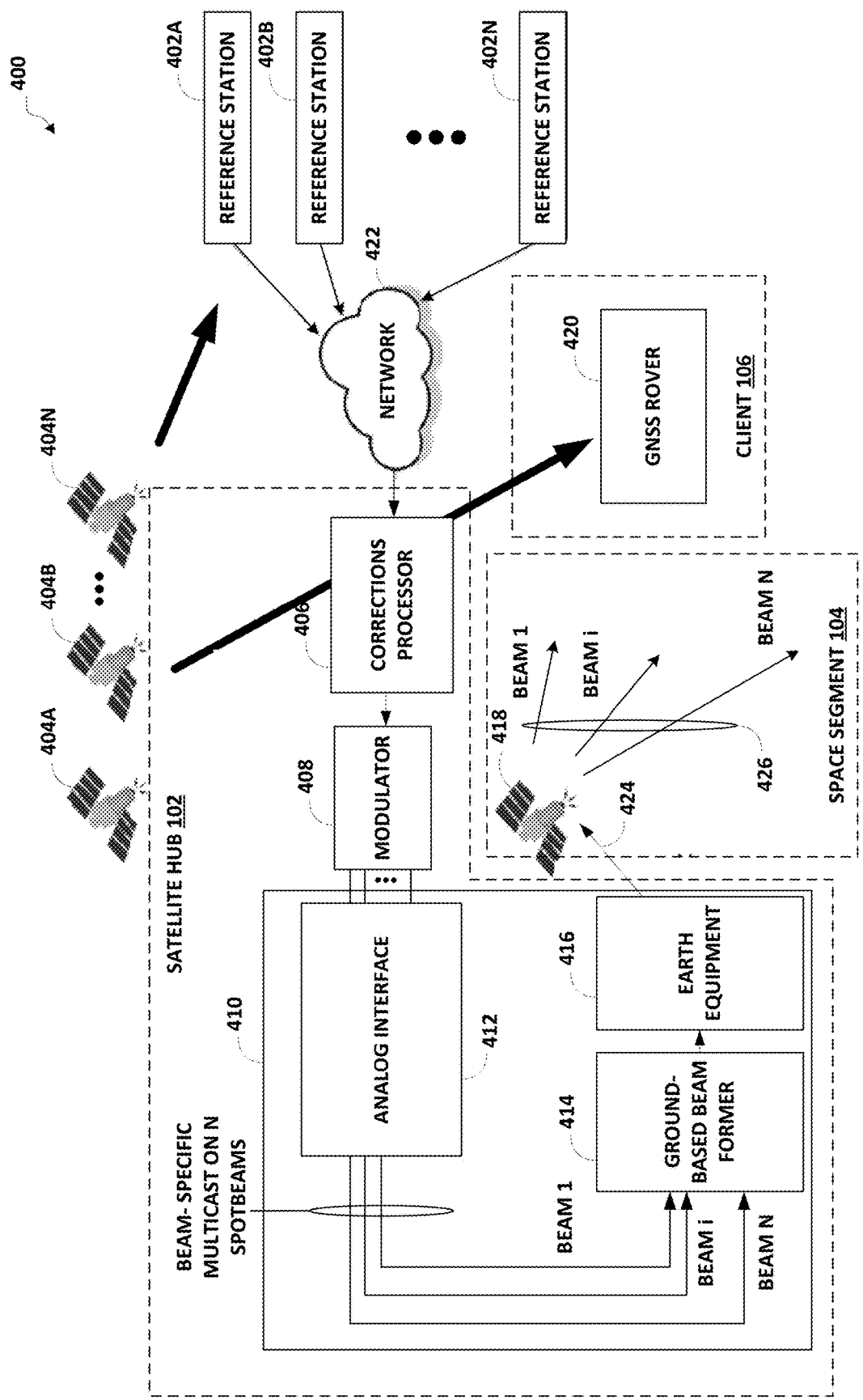
FIG. 4 is a diagram illustrating a system with another example localized content delivery platform using a broadcast/multicast delivery network in accordance with various exemplary embodiments.

FIG. 4 is a diagram illustrating a system 400 with another example localized content delivery platform using a broadcast/multicast delivery network in accordance with various exemplary embodiments. The system 400 includes a High Precision Location service (referred to herein as "HPL service"). In the example of FIG. 4, the system 400 includes a plurality of reference stations 402A-402N, a plurality of GNSS satellites 404A-404N, a corrections processor 406, a modulator 408, a satellite gateway infrastructure 410, an analog interface 412, a ground-based beam former (GBBF) 414, earth equipment 416, a spotbeam satellite 418, and a GNSS rover 420.

As illustrated in FIG. 4, the corrections processor 406, the modulator 408, and the satellite gateway infrastructure 410 is part of the satellite hub 102 as described above in FIG. 1. The corrections processor 406 and the modulator 408 combine to output content that may be considered the localized content 115 of FIG. 1. The satellite gateway infrastructure 410 is similar to a combination of the beam router 116, the IP packet core 118, the satellite IP transport 120, and the ground segment 122 of FIG. 1.

As illustrated in FIG. 4, the spotbeam satellite 418 is part of the space segment 104 as described above in FIG. 1. The spotbeam satellite 418 may be considered the spotbeam satellite 124 of FIG. 1.

Further, as illustrated in FIG. 4, the GNSS rover 420 is part of the client 106 as described in FIG. 1. The GNSS rover 420 may be considered the localized content delivery platform client 130 of FIG. 1. In the example of FIG. 4, the GNSS rover 420 also includes the terminal 126 and the location 128 of FIG. 1.

In the example of FIG. 4, the plurality of reference stations 402A-402N is deployed over a coverage area where the HPL service is intended to be provided. The plurality of reference stations 402A-402N (e.g., High Precision Location (HPL) GNSS receivers) as well as the GNSS rover 420 receive GNSS signals from the plurality of GNSS satellites 404A-404N and at a plurality of radio frequencies (e.g., radio frequencies designated L1, L2, L5, or other suitable radio frequencies). The plurality of reference stations 402A-402N comprise high precision GNSS receivers that generate signal outputs (including observables), examples of the observables includes GNSS pseudo-random code phase, RF carrier phase, and Doppler frequency offset. The observables are collected periodically (e.g., collected once per second) and communicated to the Corrections Processor (referred to herein as "CP") 406, using a wide area network 422 (e.g., a terrestrial wide area network or a satellite wide area network). The signal outputs also include the accurately surveyed location of the plurality of reference stations 402A-402N and a time stamp indicating when the observables were collected. In some examples, the signal outputs may include additional operation information, for example, information indicating the health of each of the plurality of reference stations 402A-402N, and other suitable operational information.

The corrections processor 406 may also be referred to as a corrections server. The corrections processor includes memory and an electronic processor. The memory may include a program storage area (for example, read only memory (ROM)) and a data storage area (for example, random access memory (RAM), and other non-transitory, machine-readable medium). The electronic processor may be, for example, a microprocessor or other suitable processing device.

In some embodiments, the GNSS rover 420 includes memory, an electronic processor, and a satellite communication device (for example, a satellite receiver or a satellite transceiver). The memory may include a program storage area (for example, read only memory (ROM)) and a data storage area (for example, random access memory (RAM), and other non-transitory, machine-readable medium). For example, the data storage area may include a look-up table of grid point identifiers and corresponding geographical coordinates. The electronic processor may be, for example, a microprocessor or other suitable processing device.

In some embodiments, the CP 406 determines a set of data outputs (referred to herein as "correction vectors" or "CV") that are ideal at a specified geographic location and at a projected future time. Each CV has fields which indicate the correction that should be applied to the corresponding term in the observables received by the GNSS rover 420 at the ideal location and time. The application of the corrections enables the GNSS rover 420 to substantially improve the accuracy of position, velocity and time (PVT) estimate with respect the GNSS rover 420. In some examples, the improvement in accuracy is a decrease of two orders of magnitude, i.e., decreasing a range from one to ten meters to one to ten centimeters.

The CP 406 sends a set of M CVs to the modulator 408. M is an integer that is greater than zero. These M CVs are distributed over N spotbeams covering different grid points. N is an integer that is greater than zero and less than M. In the example of FIG. 4, N may be equal to twenty-one. However, N may be any arbitrary value other than twenty-one, including a value of one (corresponding to a global beam).

The modulator 408 generates N intermediate frequency (referred to herein as "IF") carriers based on the M CVs, the N IF carriers correspond to the N spotbeams which blanket the coverage area of the spotbeam satellite 418.

In some examples, each of the N IF carriers are modulated with data corresponding to a specific subset of the M CVs according to the grid point concept described below. The subsets may include some overlap as discussed above. The N modulated IF carriers are input to the satellite gateway infrastructure 410. In some examples, the satellite gateway infrastructure 410 includes the GBBF 414 and the earth equipment 416. The GBBF 414 digitally processes the signals to enable beamforming in a satellite service band (e.g., the L-band). The earth equipment 416 an earth antenna and a feederlink radio frequency (referred to herein as "RF") sub-system that provides frequency translation to a feederlink band (e.g., the Ku-band), and uplinks the feederlink signals 424 to the spotbeam satellite 418 using the earth station antenna.

The spotbeam satellite 418 frequency translates the feederlink signals 424 to a satellite service band (e.g., the L-band), and transmits the feederlink signals 424 to the ground using a phase array antenna subsystem, where N spotbeams 426 are formed by the relative amplitude tapers and phase shifts provided by the GBBF 414.

In other examples, instead of forming the beams on the ground using the GBBF 414, the N spotbeams 426 may also be formed on the spotbeam satellite 418 using space-based beam forming (SBBF).

As described above, the CVs may be mathematically optimum at a single point in space (referred to as Geographic Center of Correction, or "GCC") and time (anticipated time when the corrections will be used, referred to as "TC"). Certain items in the CV, principally the ionospheric and tropospheric corrections, increasingly lose their value, i.e. correctness, as the distance of the GNSS rover 420 from the GCC increases. This loss in value based on the distance of the GNSS rover 420 from the GCC is referred to as the Space Decorrelation Function (referred to herein as "SDF") of the CV. The same is true of the difference between the TC and the actual consumption time of the CV, resulting in a Time Decorrelation Function (referred to herein as "TDF").

The SDF and the TDF of the CV do not vary rapidly with space and time, respectively. Assuming that the inter-site distance (referred to herein as "ISD") between the plurality of reference stations 402A-402N has been chosen to achieve a certain level of PVT performance (e.g., ten centimeters of circular error probability (referred to herein as "CEP") with ten seconds of convergence time and 90% probability), it is reasonable to expect that the CV will not decorrelate significantly as long as the distance of the GNSS rover 420 from a GCC is less than half of the ISD (i.e., 0.5*ISD). The TDF of the CV is typically such that the decorrelation is relatively small for time offsets less than five seconds, although performance has been empirically shown to continue to improve as the time offset is reduced to one second.

Predetermined locations are selected for the GCCs with the same spatial density as the plurality of reference stations 402A-402N, for the reasons stated above. These predetermined locations are referred to as "grid points." As the grid points have the same spatial density as the plurality of reference stations 402A-402N, for convenience, the grid points may be collocated with the plurality of reference stations 402A-402N. It should be noted that the above collocation is not a necessary condition to practice the method of the present disclosure—other locations of the grid points with the same geographic density will also work.

In some examples, a desired ISD may be smaller than the size of a satellite spotbeam. For instance, the ISD may be one hundred kilometers and a typical spotbeam may have a diameter of over five hundred kilometers. This means that, in a given spotbeam, it is necessary to transmit the CVs for multiple grid points. This transmission of CVs for multiple grid points in a single spotbeam is illustrated in FIG. 5.

Figure 5:
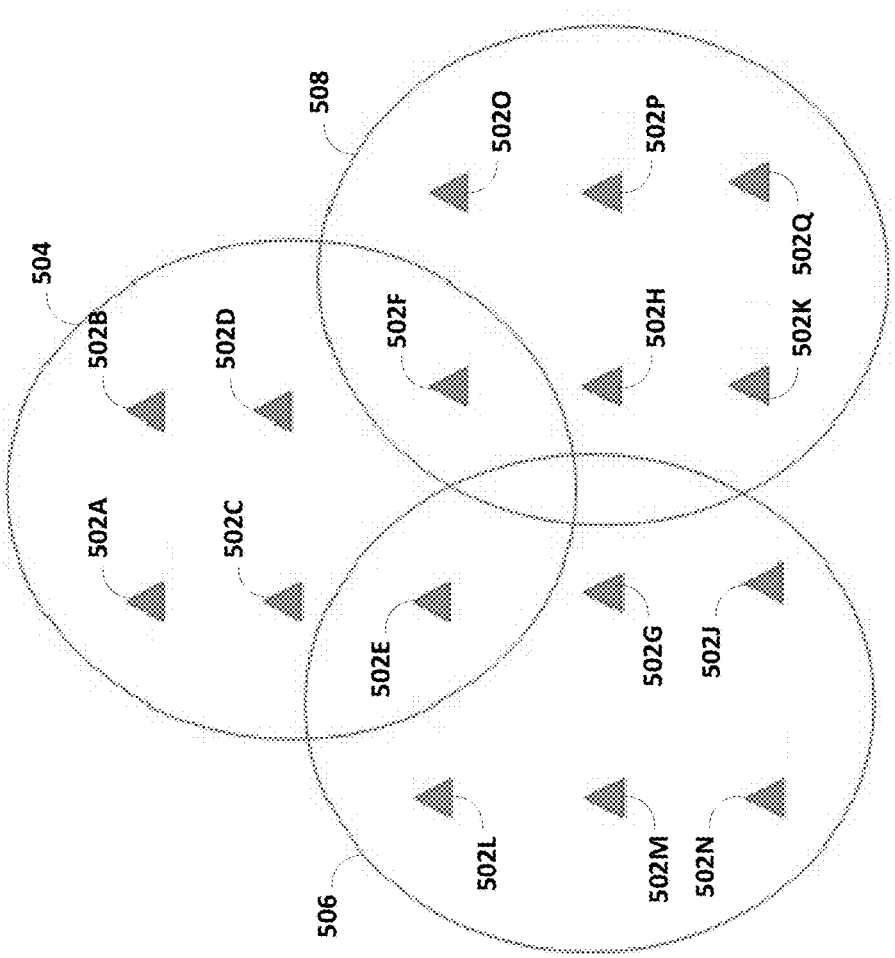
FIG. 5 is a diagram illustrating a plurality of grid points and three overlapping and adjacent spotbeams in accordance with various exemplary embodiments.

FIG. 5 is a diagram illustrating a plurality of grid points 502A-502Q and three overlapping and adjacent spotbeams 504, 506, and 508 in accordance with various exemplary embodiments. In some examples, each grid point of the plurality of grid points 502A-502Q is collocated with one reference station of the plurality of reference stations 402A-402N of FIG. 4. Each spotbeam of spotbeams 504, 506, and 508 covers six grid points of the plurality of grid points 502A-502Q. CVs corresponding to the grid points in a given beam are transmitted to that given beam. As illustrated in FIG. 5, some of the grid points are members of multiple spotbeams (e.g., grid points 502E and 502F). This overlap means that the signal transmitted to the two adjacent beams 504 and 506, may have the CVs for the common grid point 502E carried in the signals transmitted in both beams 504 and 506. Likewise, this overlap means that the signal transmitted to the two adjacent beams 504 and 508, may have the CVs for the common grid point 502F carried in the signals transmitted in both beams 504 and 508.

The grid point operation by the GNSS rover 420 of FIG. 4 may take a number of forms. In some examples, the GNSS rover 420 may periodically check its approximate location and, depending on the location, select the CV which corresponds to the nearest grid point, identified by a Grid ID.

In other examples, the GNSS rover 420 may use more than one CV to derive a more optimal CV than any individual CV. For example, when the GNSS rover 420 is approximately equidistance from two or more grid points, the GNSS rover 420 may process the CVs corresponding to all or some of those grid points as inputs to generate a more optimal CV.

The GNSS rover 420 includes a memory that stores a table of Grid IDs and corresponding locations. The GNSS rover 420 includes an electronic processor that performs a grid point check periodically, with a periodicity that is either fixed or variable. In some examples, when the periodicity is variable, the variability may be linked to the present speed of the GNSS rover 420.

Additionally, referring back to FIG. 4, in some examples, the system 400 may also deliver the broadcast/multicast HPL service using a common IP address throughout the coverage area even though different geo-tagged content (including the CV data) is delivered to different regions in the coverage area. For example, the GNSS rover 420 may use a common IP address while still receiving distinct CV data streams as the GNSS rover 420 traverses the coverage area.

In one example, the CV data targeting a given spotbeam is sent by the CP 406 to the modulator 408 with a destination IP address dedicated to the given spotbeam. The CV data targeting other spotbeams have other distinct destination IP addresses. The modulator 408 performs IP filtering, where the CV data for each spotbeam is modulated on to a distinct IF carrier but the destination IP addresses are then changed to a common destination IP address.

In another example, the CV data is sent from the CP 406 to the modulator 408 using an UDP/IP protocol. A separate UDP destination port address is used to target each spotbeam, but a common destination IP is incorporated and embedded in the CV data for a given spotbeam. The CV messages that are intended for a particular spotbeam are sent from the CP 406 to the modulator 408 with the same UDP destination port address. The modulator 408 uses the UDP destination port address to select the IF carrier on which to modulate the CV data for the corresponding spotbeam. As described above, each IF carrier is frequency translated by the spotbeam satellite 418 to a service band RF carrier in the downlink transmission by the spotbeam satellite 418.

Figure 6:
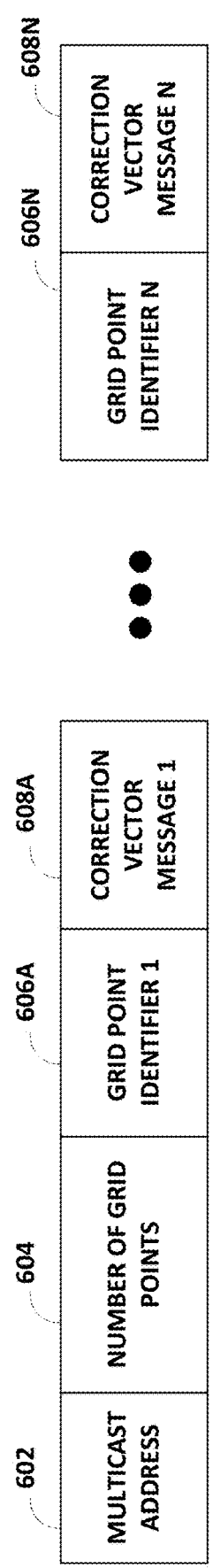
FIG. 6 is a block diagram illustrating an example data format of a localized content delivery platform (LCDP) frame with grid point identifiers and a corresponding set of correction vector messages.

FIG. 6 is a block diagram illustrating an example data format of a localized content delivery platform (LCDP) frame 600 with grid point identifiers and a corresponding set of correction vector messages. The LCDP frame 600 is a subset of the set of correction vectors and is delivered to one of the N spotbeams by the spotbeam satellite 206. In the example of FIG. 6, the LCDP frame 600 includes a multicast address section 602, a number of grid points section 604, a plurality of grid point identifier (ID) sections 606A-606N, and a plurality of correction vector message sections 608A-608N that correspond to the plurality of grid point ID sections 606A-606N.

In some examples, and as described in greater detail below in FIGS. 7 and 8, the multicast address section 602 includes a network identifier that corresponds to a common multicast IP address. In other examples, the multicast address section 602 includes a network identifier that corresponds to a unique multicast IP address.

The number of grid points section 604 includes information indicative of the number of grid points covered by the given spotbeam. Each of the plurality of grid point ID sections 606A-606N includes an identifier that identifies each grid point of the plurality of grid points (e.g., the plurality of grid points 502A-502Q of FIG. 5). Each of the plurality of correction vector message sections 608A-608A includes information regarding a correction vector message for a given grid point. For example, the correction vector message section 608A includes information regarding a correction vector message for the grid point associated with the grid point ID section 606A. Likewise, the correction vector message section 608B includes information regarding a correction vector message for the grid point associated with the grid point ID section 606B.

Figure 7:
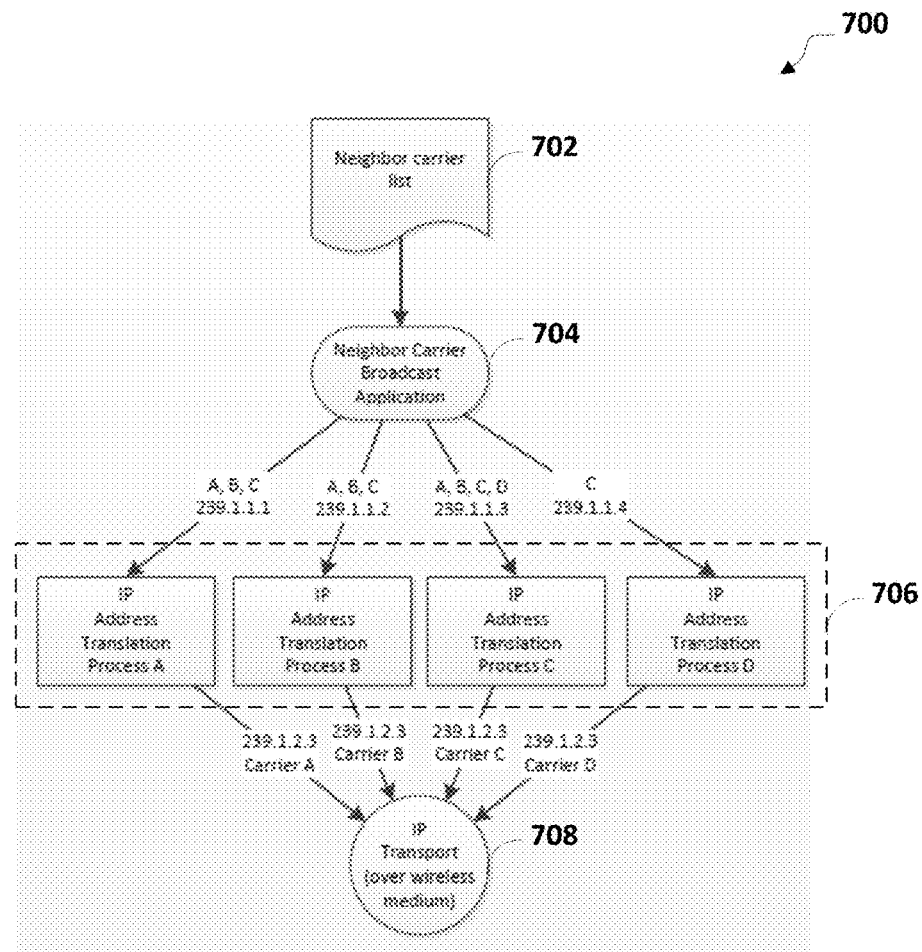
FIG. 7 is flow chart illustrating a process for delivering localized content to a common multicast IP address in accordance with various exemplary embodiments.

FIG. 7 is flow chart illustrating a process 700 for delivering localized content to a common multicast IP address. The process 700 may be performed by the system 200 or the system 400 as described above in FIGS. 2 and 4, respectively. For ease of understanding, the process will be described with respect to the system 200 of FIG. 2.

In the example of FIG. 7, a neighbor carrier list 702 is the localized content input 202. The neighbor carrier list 702 is broadcast with a neighbor carrier broadcast application 704. As illustrated in FIG. 7, the neighbor carrier list 702 is separated into different groups of neighboring carrier information (a first group of A, B, and C neighboring carrier information; a second group of A, B, and C neighboring carrier information; a third group of A, B, C, and D neighboring carrier information; and fourth group of C neighboring carrier information) and the four different groups are modulated onto four different IF carriers by the modulator 210. The four different groups are also referred to herein as "N localized content delivery platform frames." As illustrated in FIG. 7, each of the four different groups has a distinct multicast IP address (e.g., 239.1.1.1, 239.1.1.2, 239.1.1.3, and 239.1.1.4).

The spotbeam satellite 206 receives the four different groups of neighboring carrier information and separately performs IP address translation 706 on each of the four different groups of neighboring carrier information to change the four distinct multicast IP addresses into a common multicast IP address (e.g., 239.1.2.3). Stated differently, the spotbeam satellite 206 performs IP address translation 706 by replacing the multicast IP address in the LCDP frame with a common multicast IP address.

The spotbeam satellite 206 transmits a multicast transmission with each of the four different groups of neighboring carrier information in one of the N spotbeams 220. In some examples, the spotbeam satellite 206 transmits the carrier information based on the distinct multicast IP address associated with each of the four different groups. For example, the least significant bit of the original multicast IP address may be used to identify the correct spotbeam for the multicast transmission.

As illustrated in FIG. 7, the spotbeam satellite 206 broadcasts the first group of A, B, and C neighboring carrier information as part of the carrier A spotbeam and the second group of A, B, and C neighboring carrier information as part of the carrier B spotbeam. Likewise, the spotbeam satellite 206 broadcasts the third group of A, B, C, and D neighboring carrier information as part of the carrier C spotbeam and the fourth group of C neighboring carrier information as part of the carrier D spotbeam.

Figure 8:
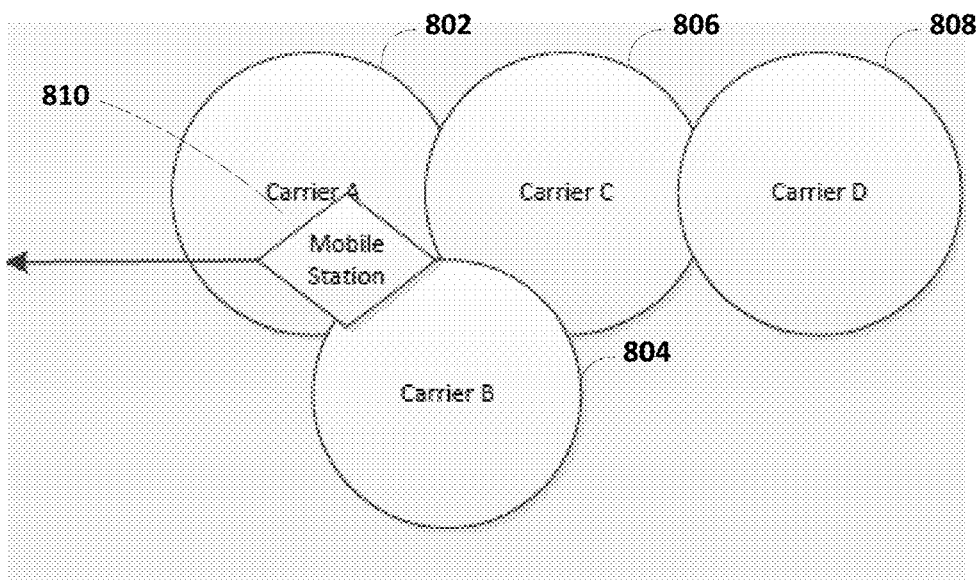
FIG. 8 is a diagram illustrating four carrier spotbeams and a mobile station.

FIG. 8 is a diagram illustrating four carrier spotbeams 802-808 and a mobile station 810. FIG. 8 is described with respect to FIG. 7.

In the example of FIG. 8, the mobile station 810 may be considered the LCDP client 208 as described above in FIG. 2. As the mobile station 810 traverses across carriers A, B, C, and D, the mobile station 810 receives different neighboring carrier information. The reception of different neighboring carrier information allows the mobile station 810 to maintain a short list of neighboring carriers to expedite the carrier reselection process when transitioning service areas.

When the mobile station 810 is within the carrier D, the mobile station 810 receives the fourth group of C neighboring carrier information. The mobile station 810 may use the fourth group of C neighboring carrier information to increase transition speed between carrier D to carrier C.

When the mobile station 810 is within the carrier C, the mobile station 810 receives the third group of A, B, C, and D neighboring carrier information. The mobile station 810 may use the third group of A, B, C, and D neighboring carrier information to increase transition speed between carrier C and carriers A, B, and D.

When the mobile station 810 is within the carrier B, the mobile station 810 receives the second group of A, B, and C neighboring carrier information. The mobile station 810 may use the third group of A, B, C, and D neighboring carrier information to increase transition speed between carrier B and carriers A and C.

Lastly, as illustrated in FIG. 8, when the mobile station 810 is within the carrier A, the mobile station 810 receives the first group of A, B, and C neighboring carrier information. The mobile station 810 may use the first group of A, B, and C neighboring carrier information to increase transition speed between carrier A and carriers B and C.

Figure 9:
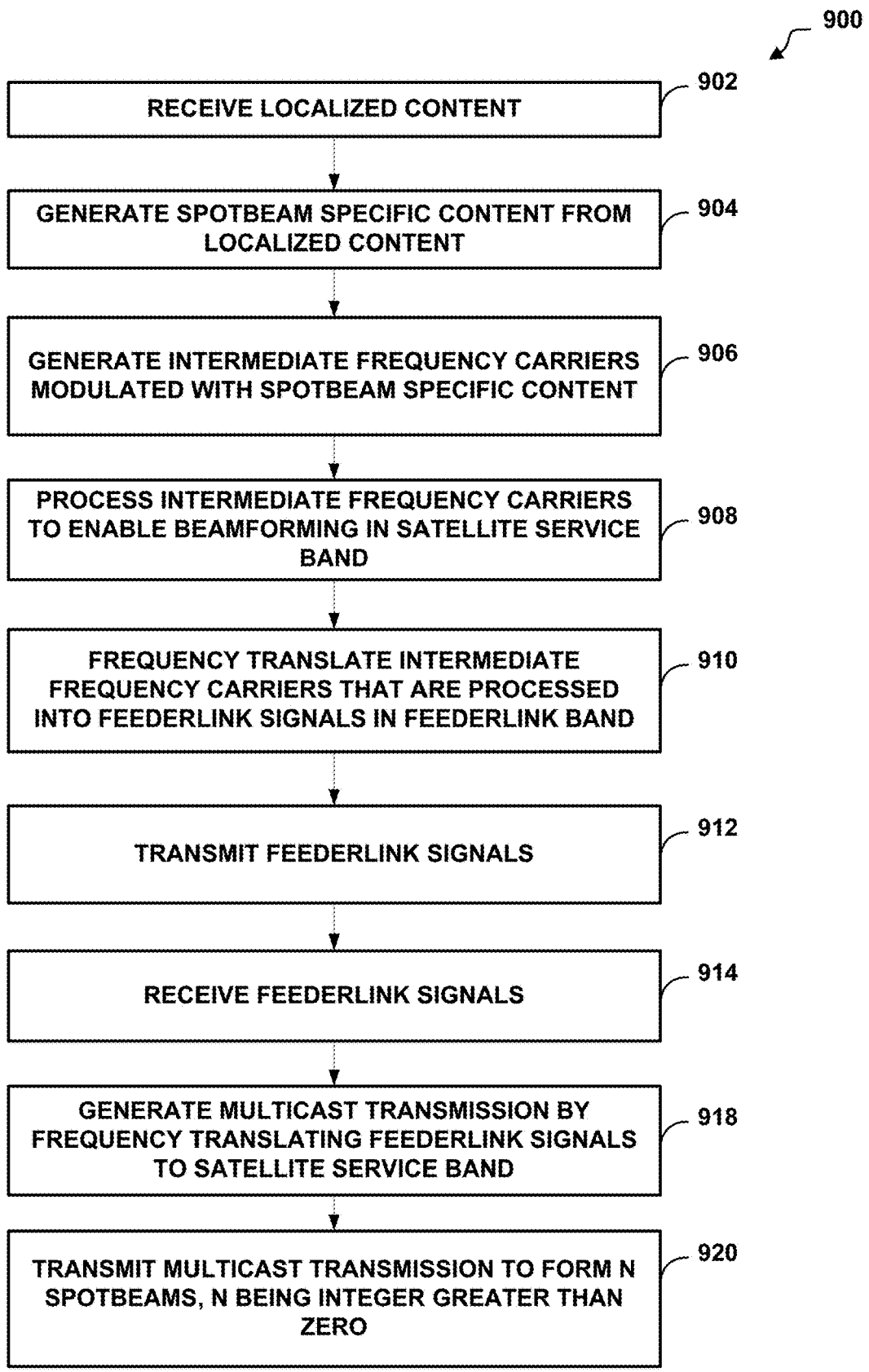
FIG. 9 is a flow chart illustrating a method of delivering localized content in accordance with various exemplary embodiments.

FIG. 9 is a flow chart illustrating a method 900 for delivering localized content. For ease of understanding, the method 900 is described with respect to the system 400 of FIG. 4. However, the method 900 is also applicable to the system 200 of FIG. 2.

In the illustrated embodiment, the method 900 includes receiving localized content (block 902). For example, receiving, with a modulator 408, a set of correction vectors.

The method 900 includes generating N localized content delivery platform frames from the localized content (block 904). For example, separating, with the modulator 408, a set of correction vectors into spotbeam specific subsets of the set of correction vectors and inserting the spotbeam specific subsets into different localized content delivery platform frames.

The method 900 includes generating intermediate frequency (IF) carriers that are modulated with the N localized content delivery platform frames (block 906). For example, generating, with the modulator 408, intermediate frequency (IF) carriers that are modulated with the spotbeam specific subsets of the set of correction vectors in their respective localized content delivery platform frames.

The method 900 includes processing the IF carriers to enable beamforming in a satellite service band (block 908). For example, processing, with a ground-based beam former 414, the IF carriers to enable beamforming in the L-band.

The method 900 includes frequency translating the IF carriers that are processed into feederlink signals in a feederlink band (block 910). For example, frequency translating, with earth equipment 416, the IF carriers that are processed into feederlink signals in the Ku-band.

The method 900 includes transmitting the feederlink signals (block 912). For example, transmitting, with the earth equipment 416, the feederlink signals 424.

The method 900 includes receiving the feederlink signals (block 914). For example, receiving, with the spotbeam satellite 418, the feederlink signals 424.

The method 900 includes generating a multicast transmission by frequency translating the feederlink signals to the satellite service band (block 916). For example, generating, with the spotbeam satellite 418, a multicast transmission by frequency translating the feederlink signals 424 to the L-band.

The method 900 can also include transmitting the multicast transmission to form N spotbeams (block 918). For example, transmitting, with the spotbeam satellite 206, the multicast transmission to form N spotbeams 426. N being an integer greater than zero.

In some examples, before receiving the localized content, the method 900 may further include receiving, with a plurality of high precision location (HPL) reference stations 402A-402N, GNSS signals from a plurality of GNSS satellites 404A-404N, generating, with the plurality of HPL reference stations 402A-402N, signal outputs including observables, outputting, with the plurality of HPL reference stations 402A-402N, the signal outputs to the network 422, receiving, with a corrections processor 406, the signal outputs via the network 422, determining, with the corrections processor 406, a set of correction vectors (CVs) to correct errors in the signal outputs, and outputting, with the corrections processor 406, the set of correction vectors (CVs) as the localized content.

In some examples, after transmitting the multicast transmission to form N spotbeams 426, the method 900 may further include receiving, with a GNSS rover 420, the GNSS signals from the plurality of GNSS satellites 404A-404N via a satellite communication device, receiving, with the GNSS rover 420, the multicast transmission in one or more of the N spotbeams 426 via the satellite communication device, determining, with the GNSS rover 420, a location of the GNSS rover 420 based on the GNSS signals, extracting, with the GNSS rover 420, one or more correction vectors from the multicast transmission based on the location of the GNSS rover 420, correcting, with the GNSS rover 420, the GNSS signals with the one or more correction vectors that are extracted, and determining, with the GNSS rover 420, a second location of the GNSS rover 420 based on the GNSS signals that are corrected.

Additionally, in some examples, extracting the one or more correction vectors from the multicast transmission based on the location of the GNSS rover 420 further includes identifying geographical coordinates of a grid point identifier that is closest to the location of the GNSS rover 420 from a look-up table stored in a memory of the GNSS rover 420, and extracting a correction vector message associated with the grid point identifier from the multicast transmission.

Alternatively, in some examples, extracting the one or more correction vectors from the multicast transmission based on the location of the GNSS rover 420 further includes identifying two or more geographical coordinates of two or more grid point identifiers that are closest to the location of the GNSS rover 420 from a look-up table stored in a memory of the GNSS rover 420, extracting each correction vector message associated with the two or more grid point identifiers from the multicast transmission, and generating a combined correction vector message by combining the each correction vector message associated with the two or more grid point identifiers that are extracted.

In some examples, the multicast transmission may include a data frame with a multicast address section, a number of grid points section, a plurality of grid point identifier sections, and a plurality of correction vector message sections. In these examples, the multicast address section may also include a common multicast IP address that is across all N spotbeams.

Thus, the present disclosure provides, among other things, a localized content delivery platform. Various features and advantages of the present disclosure are set forth in the following claims.

What is claimed is:

1. A system for delivering localized content, the system comprising:
   a modulator configured to
      receive a plurality of localized content,
      generate N localized content delivery platform frames from the plurality of localized content, and
      generate intermediate frequency (IF) carriers that are modulated with the N localized content delivery platform frames;
   a beam former configured to process the IF carriers to enable beamforming in a satellite service band;
   earth equipment configured to
      frequency translate the IF carriers that are processed into feederlink signals in a feederlink band, and
      transmit the feederlink signals; and
   a spotbeam satellite configured to
      receive the feederlink signals,
      generate a multicast transmission by frequency translating the feederlink signals to the satellite service band, and
      transmit the multicast transmission to form N spotbeams, N being an integer greater than zero,
      wherein each spotbeam of the N spotbeams includes one of the N localized content platform delivery frames that is specific to a geographic area covered by the respective spotbeam.

2. The system of claim 1, further comprising:
   a plurality of GNSS satellites;
   a plurality of high precision location (HPL) reference stations configured to
      receive GNSS signals from the plurality of GNSS satellites,
      generate signal outputs including observables, and
      output the signal outputs to a network;
   a corrections processor configured to
      receive the signal outputs via the network,
      determine a set of correction vectors, and
      output the set of correction vectors as the localized content;
   a GNSS rover including memory, an electronic processor communicatively coupled to the memory, and a satellite communication device,
   wherein the memory includes a table of grid point identifiers and corresponding geographical coordinates, and
   wherein the electronic processor is configured to
      receive the GNSS signals from the plurality of GNSS satellites via the satellite communication device,
      receive the multicast transmission in one or more of the N spotbeams via the satellite communication device,
      determine a location of the GNSS rover based on the GNSS signals,
      extract one or more correction vectors from the multicast transmission based on the location of the GNSS rover,
      correct the GNSS signals with the one or more correction vectors that are extracted, and
      determine a second location of the GNSS rover based on the GNSS signals that are corrected.

3. The system of claim 2, wherein, to extract the one or more correction vectors from the multicast transmission based on the location of the GNSS rover, the electronic processor is further configured to
   identify geographical coordinates of a grid point identifier that is closest to the location of the GNSS rover from the table, and
   extract a correction vector message associated with the grid point identifier from the multicast transmission.

4. The system of claim 2, wherein, to extract the one or more correction vectors from the multicast transmission based on the location of the GNSS rover, the electronic processor is further configured to
   identify two or more geographical coordinates of two or more grid point identifiers that are closest to the location of the GNSS rover from the table,
   extract each correction vector message associated with the two or more grid point identifiers from the multicast transmission, and
   generate a combined correction vector message by combining the each correction vector message associated with the two or more grid point identifiers that are extracted.

5. The system of claim 2, wherein the corresponding geographical coordinates are geographical coordinates of the plurality of HPL reference stations.

6. The system of claim 1, wherein the multicast transmission includes a data frame including a multicast address section, a number of grid points section, a plurality of grid point identifier sections, and a plurality of correction vector message sections.

7. The system of claim 6, wherein the multicast address section includes a common multicast IP address across all N spotbeams.

8. A method for delivering localized content, the method comprising:
   receiving, with a modulator, a plurality of localized content;
   generating, with the modulator, N localized content delivery platform frames from the plurality of localized content;
   generating, with the modulator, intermediate frequency (IF) carriers modulated with the N localized content delivery platform frames;
   processing, with a beam former, the IF carriers to enable beamforming in a satellite service band;
   frequency translating, with earth equipment, the IF carriers that are processed into feederlink signals in a feederlink band;
   transmitting, with the earth equipment, the feederlink signals;
   receiving, with a spotbeam satellite, the feederlink signals;
   generating, with the spotbeam satellite, a multicast transmission by frequency translating the feederlink signals to the satellite service band; and
   transmitting, with the spotbeam satellite, the multicast transmission to form N spotbeams, N being an integer greater than zero,
   wherein each spotbeam of the N spotbeams includes one of the N localized content platform delivery frames that is specific to a geographic area covered by the respective spotbeam.

9. The method of claim 8, further comprising:
   receiving, with a plurality of high precision location (HPL) reference stations, GNSS signals from a plurality of GNSS satellites;
   generating, with the plurality of HPL reference stations, signal outputs including observables;
   outputting, with the plurality of HPL reference stations, the signal outputs to a network;
   receiving, with a corrections processor, the signal outputs via the network;

determining, with the corrections processor, a set of correction vectors to correct errors in the signal outputs;

outputting, with the corrections processor, the set of correction vectors as the localized content;

receiving, with a GNSS rover, the GNSS signals from the plurality of GNSS satellites via a satellite communication device;

receiving, with the GNSS rover, the multicast transmission in one or more of the N spotbeams via the satellite communication device;

determining, with the GNSS rover, a location of the GNSS rover based on the GNSS signals;

extracting, with the GNSS rover, one or more correction vectors from the multicast transmission based on the location of the GNSS rover;

correcting, with the GNSS rover, the GNSS signals with the one or more correction vectors that are extracted; and determining, with the GNSS rover, a second location of the GNSS rover based on the GNSS signals that are corrected.

10. The method of claim 9, wherein extracting the one or more correction vectors from the multicast transmission based on the location of the GNSS rover further includes identifying geographical coordinates of a grid point identifier that is closest to the location of the GNSS rover from a look-up table stored in a memory of the GNSS rover; and extracting a correction vector message associated with the grid point identifier from the multicast transmission.

11. The method of claim 9, wherein extracting the one or more correction vectors from the multicast transmission based on the location of the GNSS rover further includes identifying two or more geographical coordinates of two or more grid point identifiers that are closest to the location of the GNSS rover from a look-up table stored in a memory of the GNSS rover;

extracting each correction vector message associated with the two or more grid point identifiers from the multicast transmission; and generating a combined correction vector message by combining the each correction vector message associated with the two or more grid point identifiers that are extracted.

12. The method of claim 8, wherein the multicast transmission includes a data frame including a multicast address section, a number of grid points section, a plurality of grid point identifier sections, and a plurality of correction vector message sections.

13. The method of claim 12, wherein the multicast address section includes a common multicast IP address across all N spotbeams.

14. A rover comprising:

a satellite communication device, a memory, and an electronic processor communicatively coupled to the memory, the electronic processor is configured to receive a multicast transmission in one or more of N spotbeams via the satellite communication device, N being an integer greater than zero, and extract localized content from the multicast transmission, wherein the localized content is specific to one or more geographic areas covered by the one or more of the N spotbeams.

15. The rover of claim 14, wherein the memory includes a table of grid point identifiers and corresponding geographical coordinates, and wherein the electronic processor is further configured to receive GNSS signals from a plurality of GNSS satellites via the satellite communication device, determine a location of the rover based on the GNSS signals, extract one or more correction vectors from the localized content based on the location of the rover, correct the GNSS signals with the one or more correction vectors that are extracted, and determine a second location of the rover based on the GNSS signals that are corrected.

16. The rover of claim 15, wherein, to extract the one or more correction vectors from the localized content based on the location of the rover, the electronic processor is further configured to identify geographical coordinates of a grid point identifier that is closest to the location of the rover from the table, and extract a correction vector message associated with the grid point identifier from the localized content.

17. The rover of claim 15, wherein, to extract the one or more correction vectors from the localized content based on the location of the rover, the electronic processor is further configured to identify two or more geographical coordinates of two or more grid point identifiers that are closest to the location of the rover from the table, extract each correction vector message associated with the two or more grid point identifiers from the localized content, and generate a combined correction vector message by combining the each correction vector message associated with the two or more grid point identifiers that are extracted.

18. The rover of claim 17, wherein the corresponding geographical coordinates are geographical coordinates of a plurality of high precision location (HPL) reference stations.

19. The rover of claim 14, wherein the localized content is a data frame including a multicast address section, a number of grid points section, a plurality of grid point identifier sections, and a plurality of correction vector message sections.

20. A non-transitory computer-readable medium comprising instructions that, when executed by an electronic processor, cause the electronic processor to perform a set of operations, the set of operations comprising:

controlling a satellite communication device to receive a multicast transmission in one or more of N spotbeams, N being an integer greater than zero, and extracting localized content from the multicast transmission, wherein the localized content is specific to one or more geographic areas covered by the one or more of the N spotbeams.

* * * * *